Nov. 22, 1955 R. E. ROSE 2,724,274
MILK TEMPERATURE INDICATOR FOR BABY BOTTLES
Filed Aug. 7, 1952
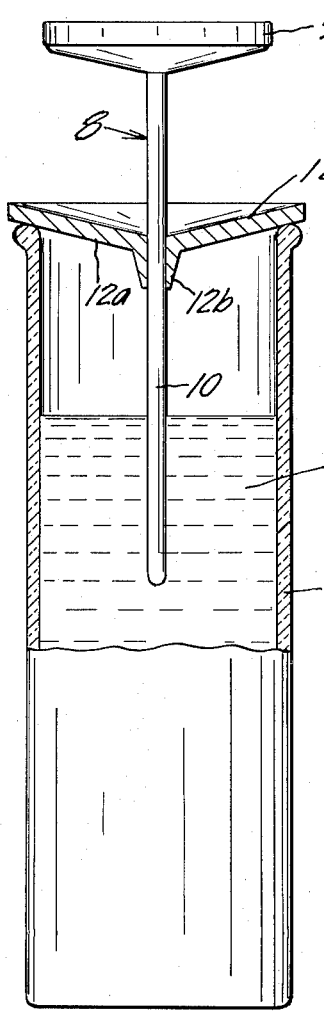
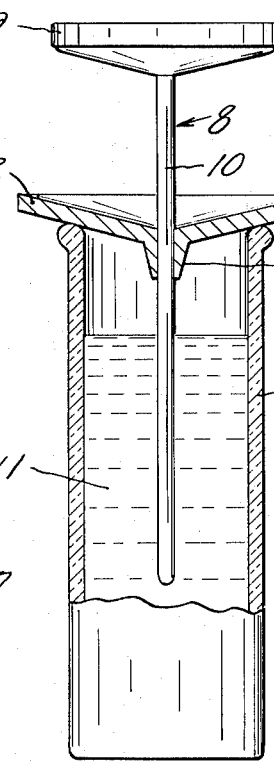
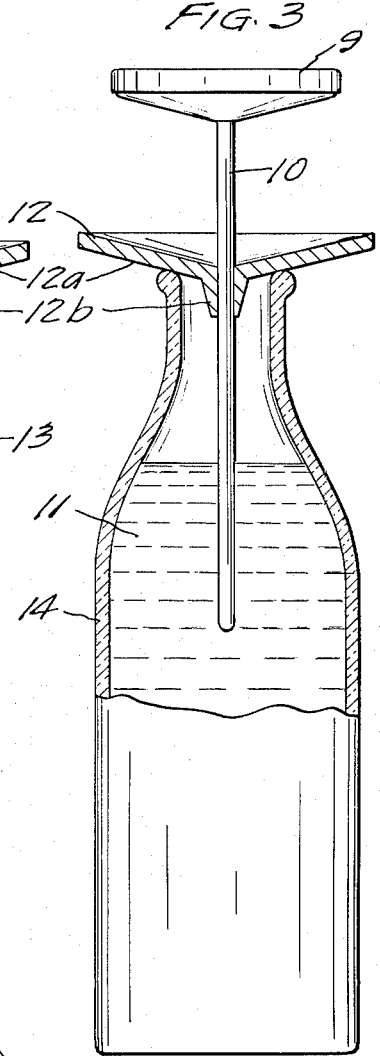
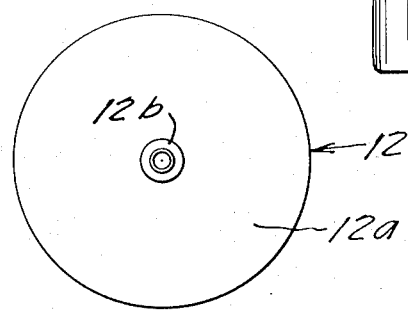
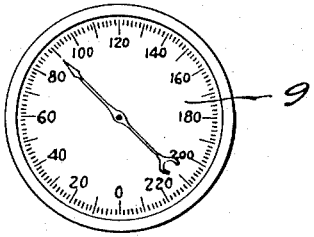
INVENTOR
ROBERT E. ROSE
BY Williamson, Williamson, Schoeber & Adams
ATTORNEYS United States Patent Office 2,724,274
Patented Nov. 22, 1955

2,724,274
MILK TEMPERATURE INDICATOR FOR BABY BOTTLES

Robert E. Rose, Minneapolis, Minn.
Application August 7, 1952, Serial No. 303,029
2 Claims. (Cl. 73—343)

This invention relates to a thermometer adapted to be positioned within a baby bottle to determine the temperature of the milk therein.

It has long been a problem to accurately determine the temperature of milk in a baby bottle and most people caring for babies test the temperature by squirting a little milk onto their arm and rely on their sensing reaction thereto to judge the milk temperature. This is messy and often inaccurate.

It is therefore an object of my present invention to provide a thermometer adapted to be mounted in the top of a baby bottle with the sensing stem thereof extending down into the milk within the open-topped bottle.

It is still another object to provide a thermometer having an adapter adjustably attached to the stem thereof to permit the thermometer to be inserted into bottles having a wide variety of different size tops, such as the various sized baby bottles presently on the market.

These and other objects and advantages of my invention will more fully appear from the following description made in connection with the accompanying drawings wherein like reference characters refer to the same or similar parts throughout the several views, and in which:

Fig. 1 is a front elevational view of one type of bottle partially cut away to show the upper portion thereof in central vertical section with my thermometer mounted therein;

Fig. 2 is a similar view of another type of bottle with my thermometer mounted therein;

Fig. 3 is also a similar view showing still a further type of bottle with my thermometer mounted therein;

Fig. 4 is a bottom plan view of the adapter mounting for the thermometer; and

Fig. 5 is a top plan view of the thermometer showing the dial face thereof.

As illustrated in the accompanying drawings, I provide a thermometer adapted to be mounted in the top of a baby bottle, such as the bottle 7 shown in Fig. 1. I have found that a dial type thermometer 8 having an indicating dial 9 and a depending temperature sensing stem 10 extending downwardly therefrom is most satisfactory. The lower portion of the stem is held in submerged relation in the milk 11 contained in bottle 7 by a supporting or mounting member 12. This supporting member 12 can be made from any suitable material such as plastic or the like and has a tapered bottom surface 12a, best shown in Figs. 1, 2 and 3. The central portion of said mounting member 12 has a thickened guiding element 12b which, in the form shown, is also tapered at a much sharper angle. This tapered surface 12a is provided to center the thermometer stem in a bottle regardless of the size of the mouth thereof of course within the diameter of said supporting member 12. Figs. 2 and 3 illustrate said member 12 mounted in different types of bottles respectively designated by the numerals 13 and 14 within which the stem 10 of the thermometer is centered by said supporting member 12 having the tapered bottom surface 12a.

The top of the mounting and supporting member 12 is recessed as shown in the drawings to receive the casing of the indicating dial 9, and the diameter of said mounting member 12 is somewhat larger than the casing of the dial to protect the same when the same is engaged therewith.

The thermometer is of course capable of being sterilized in boiling water without harming the same and is therefore designed to indicate temperatures in excess of 212 deg. F., as indicated in Fig. 5.

It will be seen that I have provided a relatively simple, yet highly ingenious, thermometer adapted to be mounted in a wide variety of different bottles having different size mouth openings to indicate the temperature of the milk being warmed therein. It should be noted that certain types of nipples presently on the market will not discharge milk therethrough without actually sucking thereon and therefore, with such nipples, it is not possible to merely shake out a few drops to determine the milk temperature as was previously done, thus requiring some other means of determining the milk temperature. Obviously, my invention herein described affords a simple, yet highly efficient and accurate, means for determining the milk temperature within a baby bottle.

It will, of course, be understood that various changes may be made in the form, details, arrangement and proportions of the parts without departing from the scope of this invention which, generally stated, consists in the matter shown and described herein and set forth in the appended claims.

What I claim is:

1. A temperature sensing device comprising a thermometer including an enlarged dial member having an elongate sensing stem depending therefrom, and a combined stem-positioning and mounting member engaged therewith, said stem-positioning and mounting member including a closure portion having a gradually downwardly tapered bottom surface for engagement with the mouth of a container and a stem guiding element fixed in depending relation to said mounting portion centrally thereof having a stem-receiving aperture extending therethrough and through the mounting portion, said mounting member being imperforate except for the stem-receiving aperture and the top of the mounting member being recessed, said sensing stem of the thermometer being projected through the stem-receiving aperture and said enlarged dial member being shaped to conform with said recessed top of the mounting member to be received therein to facilitate compact storage thereof, and said mounting member being of a larger diameter than said enlarged dial member of the thermometer to protect the periphery of the latter.

2. A temperature sensing device comprising a thermometer including an enlarged dial member having an elongate sensing stem depending therefrom, and a combined stem-positioning and mounting member engaged therewith, said stem-positioning and mounting member including a closure portion having a gradually downwardly tapered bottom surface for engagement with the mouth of a container and having a stem-receiving aperture extending therethrough, said mounting member being imperforate except for the stem-receiving aperture and the top of the mounting member being recessed, said sensing stem of the thermometer being projected through the stem-receiving aperture and said enlarged dial member being shaped to conform with said recessed top of the mounting member to be received therein to facilitate compact storage thereof, and said mounting member being of a larger diameter than said enlarged dial member of the thermometer to protect the periphery of the latter.

References Cited in the file of this patent

UNITED STATES PATENTS

| 1,502,118 | Osborne | July 22, 1924 |
| 2,179,158 | Marks | Nov. 7, 1939 |

FOREIGN PATENTS

| 4,151 | Germany | Mar. 4, 1879 |
| 155,050 | Germany | June 23, 1903 |